US005450449A

United States Patent [19]

Kroon

[11] Patent Number: 5,450,449

[45] Date of Patent: Sep. 12, 1995

[54] LINEAR PREDICTION COEFFICIENT GENERATION DURING FRAME ERASURE OR PACKET LOSS

[75] Inventor: Peter Kroon, Green Brook, N.J.

[73] Assignee: AT&T IPM Corp., Coral Gables, Fla.

[21] Appl. No.: 212,440

[22] Filed: Mar. 14, 1994

[51] Int. Cl.[6] .............................................. H04B 14/06

[52] U.S. Cl. .................................. 375/350; 395/2.41; 395/2.28; 348/409; 381/51

[58] Field of Search .................. 375/27, 103; 348/384, 348/409; 381/51, 29, 36; 395/2.28, 2.71, 2.76

[56] References Cited

U.S. PATENT DOCUMENTS

| | | | |
|---|---|---|---|
| 3,624,302 | 11/1971 | Atal | 395/2.71 |
| 4,319,083 | 3/1982 | Wiggins et al. | 395/2.71 |
| 4,354,056 | 10/1982 | Brantingham et al. | 395/2.71 |
| 5,018,200 | 5/1991 | Ozawa | 381/36 |
| 5,327,520 | 7/1994 | Chen | 395/2.28 |
| 5,353,408 | 10/1994 | Kato et al. | 395/2.71 |

OTHER PUBLICATIONS

Study Group XV–Contribution No., "Title: A Solution for the P50 Problem:," International Telegraph and Telephone Consultative Committee (CCITT) Study period 1989–1992, COM XV–No., 1–7 (May 1992).

R. V. Cox et al., "Robust CELP Coders for Noisy Backgrounds and Noise Channels," *IEEE*, 739–742 (1989).

D. J. Goodman et al., "Waveform Substitution Techniques for Recovering Missing Speech Segments in Packet Voice Communications," *IEEE Transactions on Acoustics, Speech, and Signal Processing*, vol. ASSP–34, No. 6, 1440–1448 (Dec. 1986).

Y. Tohkura et al., "Spectral Smoothing Technique in PARCOR Speech Analysis–Synthesis," *IEEE Transactions on Acoustics, Speech, and Signal Processing*, vol. ASSP–26, No. 6, 587–596 (Dec. 1978).

*Primary Examiner*—Stephen Chin
*Assistant Examiner*—T. Ghebretinsae
*Attorney, Agent, or Firm*—Thomas A. Restaino

[57] ABSTRACT

A speech coding system robust to frame erasure (or packet loss) is described. Illustrative embodiments are directed to a modified version of CCITT standard G.728. In the event of frame erasure, vectors of an excitation signal are synthesized based on previously stored excitation signal vectors generated during non-erased frames. This synthesis differs for voiced and non-voiced speech. During erased frames, linear prediction filter coefficients are synthesized as a weighted extrapolation of a set of linear prediction filter coefficients determined during non-erased frames. The weighting factor is a number less than 1. This weighting accomplishes a bandwidth-expansion of peaks in the frequency response of a linear predictive filter. Computational complexity during erased frames is reduced through the elimination of certain computations needed during non-erased frames only. This reduction in computational complexity offsets additional computation required for excitation signal synthesis and linear prediction filter coefficient generation during erased frames.

2 Claims, 7 Drawing Sheets

Microfiche Appendix Included
(2 Microfiche, 84 Pages)

FIG. 1
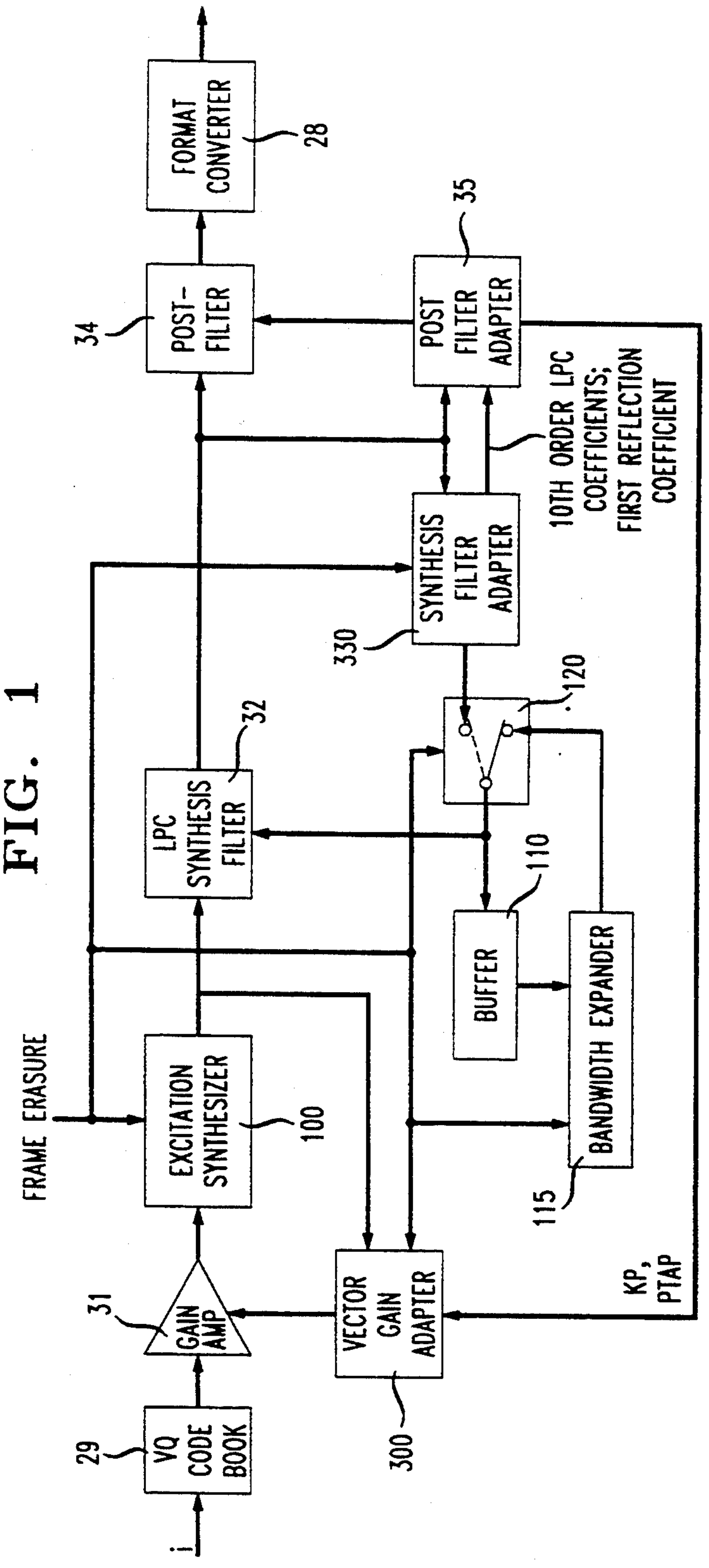
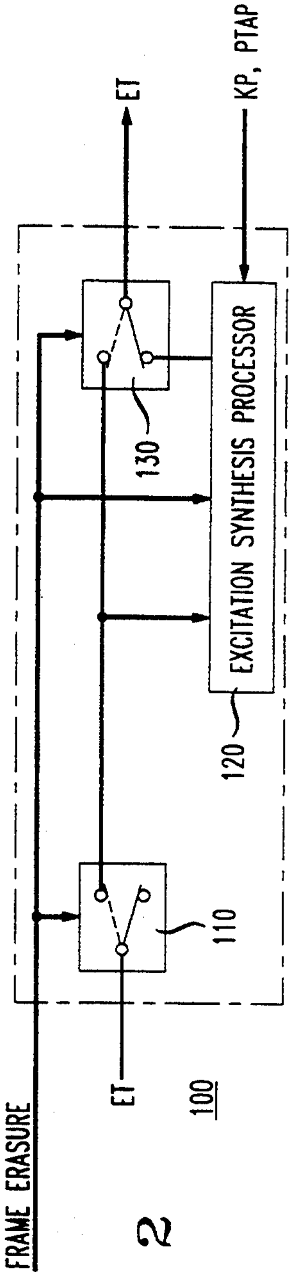
FIG. 2

LINEAR PREDICTION COEFFICIENT GENERATION DURING FRAME ERASURE OR PACKET LOSS

FIELD OF THE INVENTION

The present invention relates generally to speech coding arrangements for use in wireless communication systems, and more particularly to the ways in which such speech coders function in the event of burst-like errors in wireless transmission. This application additionally includes amicrofiche appendix comprising 2 sheets of microfiche having a total number of 84 pages.

BACKGROUND OF THE INVENTION

Many communication systems, such as cellular telephone and personal communications systems, rely on wireless channels to communicate information. In the course of communicating such information, wireless communication channels can suffer from several sources of error, such as multipath fading. These error sources can cause, among other things, the problem of frame erasure. An erasure refers to the total loss or substantial corruption of a set of bits communicated to a receiver. A frame is a predetermined fixed number of bits.

If a frame of bits is totally lost, then the receiver has no bits to interpret. Under such circumstances, the receiver may produce a meaningless result. If a frame of received bits is corrupted and therefore unreliable, the receiver may produce a severely distorted result.

As the demand for wireless system capacity has increased, a need has arisen to make the best use of available wireless system bandwidth. One way to enhance the efficient use of system bandwidth is to employ a signal compression technique. For wireless systems which carry speech signals, speech compression (or speech coding) techniques may be employed for this purpose. Such speech coding techniques include analysis-by-synthesis speech coders, such as the well-known code-excited linear prediction (or CELP) speech coder.

The problem of packet loss in packet-switched networks employing speech coding arrangements is very similar to frame erasure in the wireless context. That is, due to packet loss, a speech decoder may either fail to receive a frame or receive a frame having a significant number of missing bits. In either case, the speech decoder is presented with the same essential problem—the need to synthesize speech despite the loss of compressed speech information. Both "frame erasure" and "packet loss" concern a communication channel (or network) problem which causes the loss of transmitted bits. For purposes of this description, therefore, the term "frame erasure" may be deemed synonymous with packet loss.

CELP speech coders employ a codebook of excitation signals to encode an original speech signal. These excitation signals are used to "excite" a linear predictive (LPC) filter which synthesizes a speech signal (or some precursor to a speech signal) in response to the excitation. The synthesized speech signal is compared to the signal to be coded. The codebook excitation signal which most closely matches the original signal is identified. The identified excitation signal's codebook index is then communicated to a CELP decoder (depending upon the type of CELP system, other types of information may be communicated as well). The decoder contains a codebook identical to that of the CELP coder. The decoder uses the transmitted index to select an excitation signal from its own codebook. This selected excitation signal is used to excite the decoder's LPC filter. Thus excited, the LPC filter of the decoder generates a decoded (or quantized) speech signal—the same speech signal which was previously determined to be closest to the original speech signal.

Wireless and other systems which employ speech coders may be more sensitive to the problem of frame erasure than those systems which do not compress speech. This sensitivity is due to the reduced redundancy of coded speech (compared to uncoded speech) making the possible loss of each communicated bit more significant. In the context of a CELP speech coders experiencing frame erasure, excitation signal codebook indices may be either lost or substantially corrupted. Because of the erased frame(s), the CELP decoder will not be able to reliably identify which entry in its codebook should be used to synthesize speech. As a result, speech coding system performance may degrade significantly.

As a result of lost excitation signal codebook indicies, normal techniques for synthesizing an excitation signal in a decoder are ineffective. These techniques must therefore be replaced by alternative measures. A further result of the loss of codebook indices is that the normal signals available for use in generating linear prediction coefficients are unavailable. Therefore, an alternative technique for generating such coefficients is needed.

SUMMARY OF THE INVENTION

The present invention generates linear prediction coefficient signals during frame erasure based on a weighted extrapolation of linear prediction coefficient signals generated during a non-erased frame. This weighted extrapolation accomplishes an expansion of the bandwidth of peaks in the frequency response of a linear prediction filter.

Illustratively, linear prediction coefficient signals generated during a non-erased frame are stored in buffer memory. When a frame erasure occurs, the last "good" set of coefficient signals are weighted by a bandwidth expansion factor raised to an exponent. The exponent is the index identifying the coefficient of interest. The factor is a number less than 1.

BRIEF DESCRIPTION OF THE DRAWINGS

FIG. 1 presents a block diagram of a G.728 decoder modified in accordance with the present invention.

FIG. 2 presents a block diagram of an illustrative excitation synthesizer of FIG. 1 in accordance with the present invention.

DETAILED DESCRIPTION

I. Introduction

Figure 3:
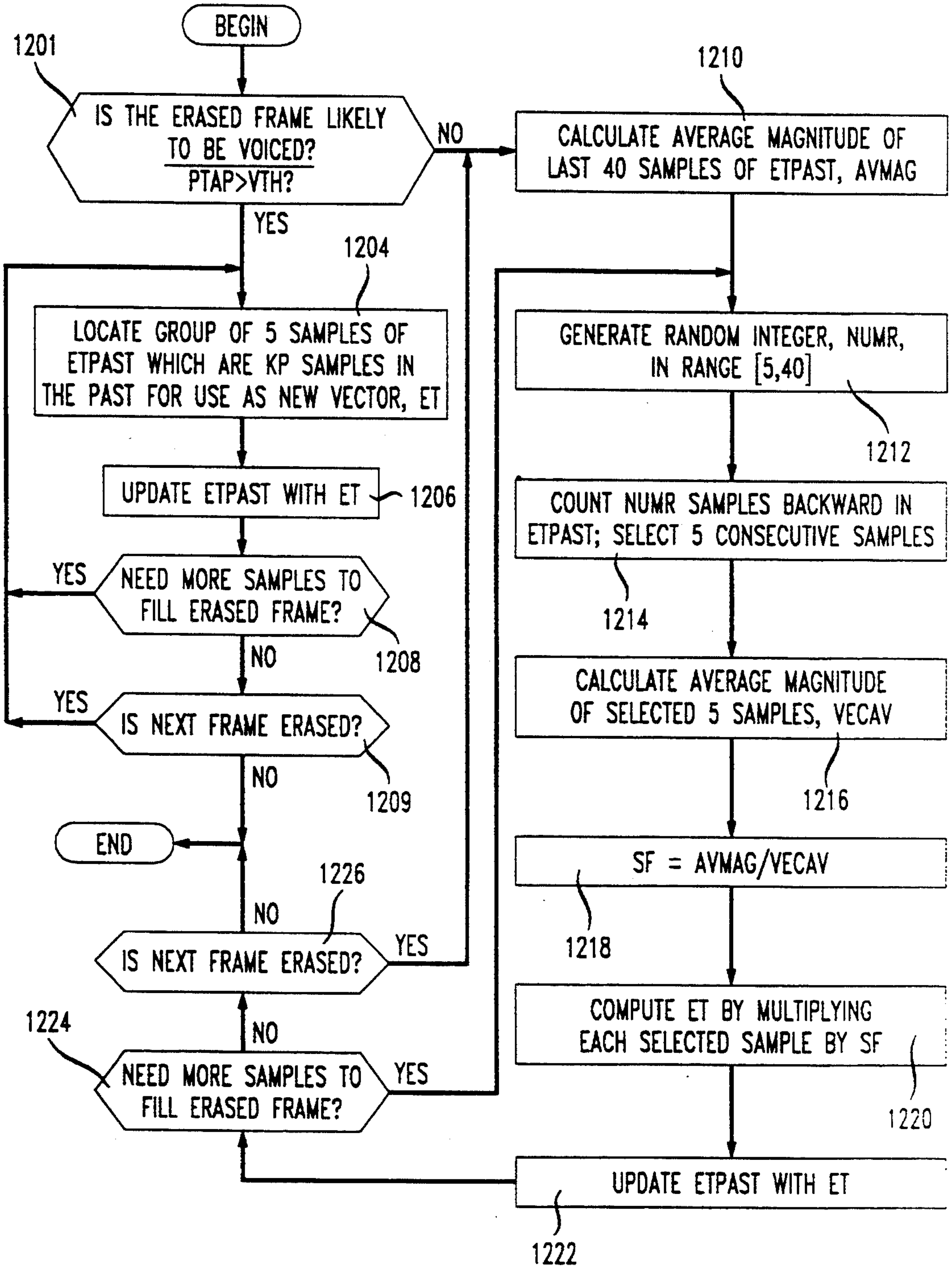
FIG. 3 presents a block-flow diagram of the synthesis mode operation of an excitation synthesis processor of FIG. 2.

The present invention concerns the operation of a speech coding system experiencing frame erasure—that is, the loss of a group of consecutive bits in the compressed bit-stream which group is ordinarily used to synthesize speech. The description which follows concerns features of the present invention applied illustratively to the well-known 16 kbit/s low-delay CELP (LD-CELP) speech coding system adopted by the CCITT as its international standard G.728 (for the convenience of the reader, the draft recommendation which was adopted as the G.728 standard is attached hereto as an Appendix; the draft will be referred to herein as the "G.728 standard draft"). This description notwithstanding, those of ordinary skill in the art will appreciate that features of the present invention have applicability to other speech coding systems.

The G.728 standard draft includes detailed descriptions of the speech encoder and decoder of the standard (See G.728 standard draft, sections 3 and 4). The first illustrative embodiment concerns modifications to the decoder of the standard. While no modifications to the encoder are required to implement the present invention, the present invention may be augmented by encoder modifications. In fact, one illustrative speech coding system described below includes a modified encoder.

Knowledge of the erasure of one or more frames is an input to the illustrative embodiment of the present invention. Such knowledge may be obtained in any of the conventional ways well known in the art. For example, frame erasures may be detected through the use of a conventional error detection code. Such a code would be implemented as pan of a conventional radio transmission/reception subsystem of a wireless communication system.

For purposes of this description, the output signal of the decoder's LPC synthesis filter, whether in the speech domain or in a domain which is a precursor to the speech domain, will be referred to as the "speech signal." Also, for clarity of presentation, an illustrative frame will be an integral multiple of the length of an adaptation cycle of the G.728 standard. This illustrative frame length is, in fact, reasonable and allows presentation of the invention without loss of generality. It may be assumed, for example, that a frame is 10 ms in duration or four times the length of a G.728 adaptation cycle. The adaptation cycle is 20 samples and corresponds to a duration of 2.5 ms.

For clarity of explanation, the illustrative embodiment of the present invention is presented as comprising individual functional blocks. The functions these blocks represent may be provided through the use of either shared or dedicated hardware, including, but not limited to, hardware capable of executing software. For example, the blocks presented in FIGS. 1, 2, 6, and 7 may be provided by a single shared processor. (Use of the term "processor" should not be construed to refer exclusively to hardware capable of executing software.)

Illustrative embodiments may comprise digital signal processor (DSP) hardware, such as the AT&T DSP 16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

II. An Illustrative Embodiment

FIG. 1 presents a block diagram of a G.728 LD-CELP decoder modified in accordance with the present invention (FIG. 1 is a modified version of FIG. 3 of the G.728 standard draft). In normal operation (i.e., without experiencing frame erasure) the decoder operates in accordance with G.728. It first receives codebook indices, i, from a communication channel. Each index represents a vector of five excitation signal samples which may be obtained from excitation VQ codebook 29. Codebook 29 comprises gain and shape codebooks as described in the G.728 standard draft. Codebook 29 uses each received index to extract an excitation codevector. The extracted codevector is that which was determined by the encoder to be the best match with the original signal. Each extracted excitation codevector is scaled by gain amplifier 31. Amplifier 31 multiplies each sample of the excitation vector by a gain determined by vector gain adapter 300 (the operation of vector gain adapter 300 is discussed below). Each scaled excitation vector, ET, is provided as an input to an excitation synthesizer 100. When no frame erasures occur, synthesizer 100 simply outputs the scaled excitation vectors without change. Each scaled excitation vector is then provided as input to an LPC synthesis filter 32. The LPC synthesis filter 32 uses LPC coefficients provided by a synthesis filter adapter 330 through switch 120 (switch 120 is configured according to the "dashed" line when no frame erasure occurs; the operation of synthesis filter adapter 330, switch 120, and bandwidth expander 115 are discussed below). Filter 32 generates decoded (or "quantized") speech. Filter 32 is a 50th order synthesis filter capable of introducing periodicity in the decoded speech signal (such periodicity enhancement generally requires a filter of order greater than 20). In accordance with the G.728 standard, this decoded speech is then postfiltered by operation of postfilter 34 and postfilter adapter 35. Once postfiltered, the format of the decoded speech is converted to an appropriate standard format by format converter 28. This format conversion facilitates subsequent use of the decoded speech by other systems.

A. Excitation Signal Synthesis During Frame Erasure

In the presence of frame erasures, the decoder of FIG. 1 does not receive reliable information (if it receives anything at all) concerning which vector of excitation signal samples should be extracted from codebook 29. In this case, the decoder must obtain a substitute excitation signal for use in synthesizing a speech signal. The generation of a substitute excitation signal during periods of frame erasure is accomplished by excitation synthesizer 100.

FIG. 2 presents a block diagram of an illustrative excitation synthesizer 100 in accordance with the present invention. During frame erasures, excitation synthesizer 100 generates one or more vectors of excitation signal samples based on previously determined excitation signal samples. These previously determined excitation signal samples were extracted with use of previously received codebook indices received from the communication channel. As shown in FIG. 2, excitation synthesizer 100 includes tandem switches 110, 130 and excitation synthesis processor 120. Switches 110, 130 respond to a frame erasure signal to switch the mode of the synthesizer 100 between normal mode (no frame erasure) and synthesis mode (frame erasure). The frame erasure signal is a binary flag which indicates whether the current frame is normal (e.g., a value of "0") or erased (e.g., a value of "1"). This binary flag is refreshed for each frame.

1. Normal Mode

In normal mode (shown by the dashed lines in switches 110 and 130), synthesizer 100 receives gain-scaled excitation vectors, ET (each of which comprises five excitation sample values), and passes those vectors to its output. Vector sample values are also passed to excitation synthesis processor 120. Processor 120 stores these sample values in a buffer, ETPAST, for subsequent use in the event of frame erasure. ETPAST holds 200 of the most recent excitation signal sample values (i.e., 40 vectors) to provide a history of recently received (or synthesized) excitation signal values. When ETPAST is full, each successive vector of five samples pushed into the buffer causes the oldest vector of five samples to fall out of the buffer. (As will be discussed below with reference to the synthesis mode, the history of vectors may include those vectors generated in the event of frame erasure.)

2. Synthesis Mode

In synthesis mode (shown by the solid lines in switches 110 and 130), synthesizer 100 decouples the gain-scaled excitation vector input and couples the excitation synthesis processor 120 to the synthesizer output. Processor 120, in response to the frame erasure signal, operates to synthesize excitation signal vectors.

FIG. 3 presents a block-flow diagram of the operation of processor 120 in synthesis mode. At the outset of processing, processor 120 determines whether erased frame(s) are likely to have contained voiced speech (see step 1201). This may be done by conventional voiced speech detection on past speech samples. In the context of the G.728 decoder, a signal PTAP is available (from the postfilter) which may be used in a voiced speech decision process. PTAP represents the optimal weight of a single-tap pitch predictor for the decoded speech. If PTAP is large (e.g., close to 1), then the erased speech is likely to have been voiced. If PTAP is small (e.g., close to 0), then the erased speech is likely to have been non- voiced (i.e., unvoiced speech, silence, noise). An empirically determined threshold, VTH, is used to make a decision between voiced and non-voiced speech. This threshold is equal to 0.6/1.4 (where 0.6 is a voicing threshold used by the G.728 postfilter and 1.4 is an experimentally determined number which reduces the threshold so as to err on the side on voiced speech).

If the erased frame(s) is determined to have contained voiced speech, a new gain-scaled excitation vector ET is synthesized by locating a vector of samples within buffer ETPAST, the earliest of which is KP samples in the past (see step 1204). KP is a sample count corresponding to one pitch-period of voiced speech. KP may be determined conventionally from decoded speech; however, the postfilter of the G.728 decoder has this value already computed. Thus, the synthesis of a new vector, ET, comprises an extrapolation (e.g., copying) of a set of 5 consecutive samples into the present. Buffer ETPAST is updated to reflect the latest synthesized vector of sample values, ET (see step 1206). This process is repeated until a good (non-erased) frame is received (see steps 1208 and 1209). The process of steps 1204, 1206, 1208 and 1209 amount to a periodic repetition of the last KP samples of ETPAST and produce a periodic sequence of ET vectors in the erased frame(s) (where KP is the period). When a good (non-erased) frame is received, the process ends.

If the erased frame(s) is determined to have contained non-voiced speech (by step 1201), then a different synthesis procedure is implemented. An illustrative synthesis of ET vectors is based on a randomized extrapolation of groups of five samples in ETPAST. This randomized extrapolation procedure begins with the computation of an average magnitude of the most recent 40 samples of ETPAST (see step 1210). This average magnitude is designated as AVMAG. AVMAG is used in a process which insures that extrapolated ET vector samples have the same average magnitude as the most recent 40 samples of ETPAST.

A random integer number, NUMR, is generated to introduce a measure of randomness into the excitation synthesis process. This randomness is important because the erased frame contained unvoiced speech (as determined by step 1201 ). NUMR may take on any integer value between 5 and 40, inclusive (see step 1212). Five consecutive samples of ETPAST are then selected, the oldest of which is NUMR samples in the past (see step 1214). The average magnitude of these selected samples is then computed (see step 1216). This average magnitude is termed VECAV. A scale factor, SF, is computed as the ratio of AVMAG to VECAV (see step 1218). Each sample selected from ETPAST is then multiplied by SF. The scaled samples are then used as the synthesized samples of ET (see step 1220). These synthesized samples are also used to update ETPAST as described above (see step 1222).

If more synthesized samples are needed to fill an erased frame (see step 1224), steps 1212–1222 are repeated until the erased flame has been filled. If a consecutive subsequent flame(s) is also erased (see step 1226), steps 1210–1224 are repeated to fill the subsequent erased frame(s). When all consecutive erased frames are filled with synthesized ET vectors, the process ends.

3. Alternative Synthesis Mode for Non-voiced Speech

Figure 4:
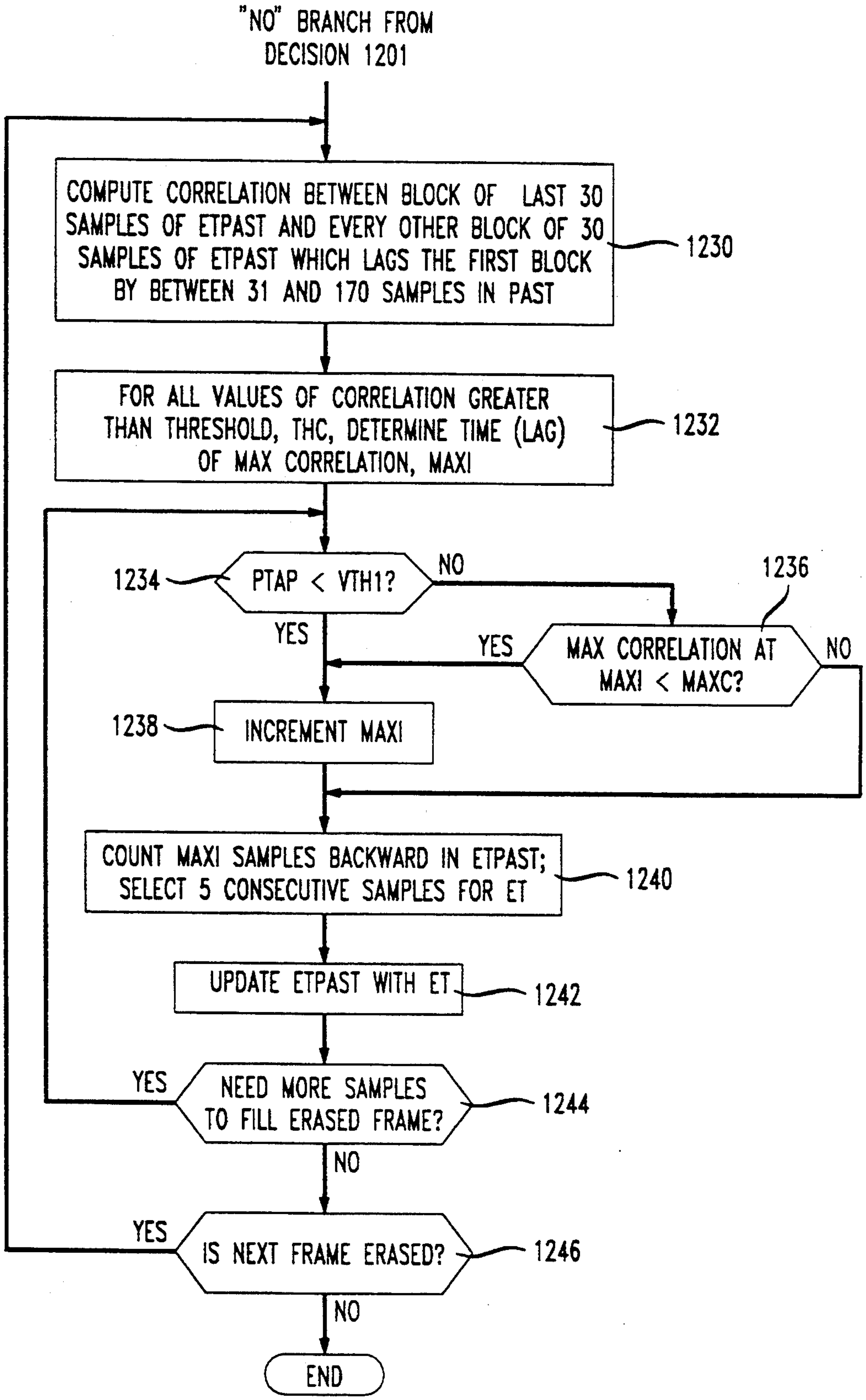
FIG. 4 presents a block-flow diagram of an alternative synthesis mode operation of the excitation synthesis processor of FIG. 2.

FIG. 4 presents a block-flow diagram of an alternative operation of processor 120 in excitation synthesis mode. In this alternative, processing for voiced speech is identical to that described above with reference to FIG. 3. The difference between alternatives is found in the synthesis of ET vectors for non-voiced speech. Because of this, only that processing associated with non-voiced speech is presented in FIG. 4.

As shown in the Figure, synthesis of ET vectors for non-voiced speech begins with the computation of correlations between the most recent block of 30 samples stored in buffer ETPAST and every other block of 30 samples of ETPAST which lags the most recent block by between 31 and 170 samples (see step 1230). For example, the most recent 30 samples of ETPAST is first correlated with a block of samples between ETPAST samples 32–61, inclusive. Next, the most recent block of 30 samples is correlated with samples of ETPAST between 33–62, inclusive, and so on. The process continues for all blocks of 30 samples up to the block containing samples between 171–200, inclusive For all computed correlation values greater than a threshold value, THC, a time lag (MAXI) corresponding to the maximum correlation is determined (see step 1232).

Next, tests are made to determine whether the erased frame likely exhibited very low periodicity. Under circumstances of such low periodicity, it is advantageous to avoid the introduction of artificial periodicity into the ET vector synthesis process. This is accomplished by varying the value of time lag MAXI. If either (i) PTAP is less than a threshold, VTH1 (see step 1234), or (ii) the maximum correlation corresponding to MAXI is less than a constant, MAXC (see step 1236), then very low periodicity is found. As a result, MAXI is incremented by 1 (see step 1238). If neither of conditions (i) and (ii) are satisfied, MAXI is not incremented. Illustrative values for VTH1 and MAXC are 0.3 and $3\times10^7$, respectively.

MAXI is then used as an index to extract a vector of samples from ETPAST. The earliest of the extracted samples are MAXI samples in the past. These extracted samples serve as the next ET vector (see step 1240). As before, buffer ETPAST is updated with the newest ET vector samples (see step 1242).

If additional samples are needed to fill the erased frame (see step 1244), then steps 1234–1242 are repeated. After all samples in the erased frame have been filled, samples in each subsequent erased frame are filled (see step 1246) by repeating steps 1230–1244. When all consecutive erased frames are filled with synthesized ET vectors, the process ends.

B. LPC Filter Coefficients for Erased Frames

In addition to the synthesis of gain-scaled excitation vectors, ET, LPC filter coefficients must be generated during erased frames. In accordance with the present invention, LPC filter coefficients for erased frames are generated through a bandwidth expansion procedure. This bandwidth expansion procedure helps account for uncertainty in the LPC filter frequency response in erased frames. Bandwidth expansion softens the sharpness of peaks in the LPC filter frequency response.

Figure 10:
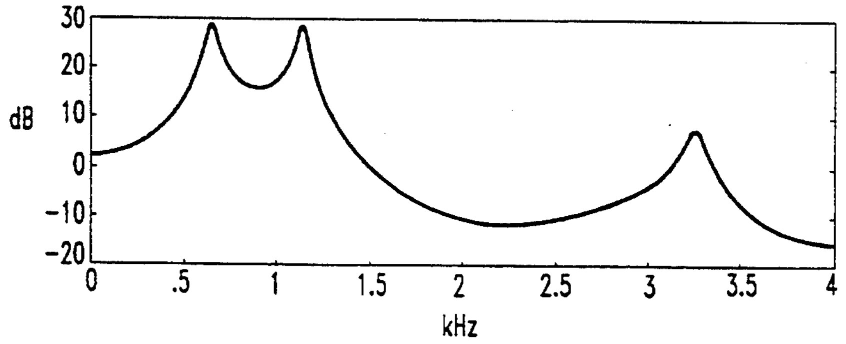
FIGS. 10 and 11 present an LPC filter frequency response and a bandwidth-expanded version of same, respectively.
Figure 11:
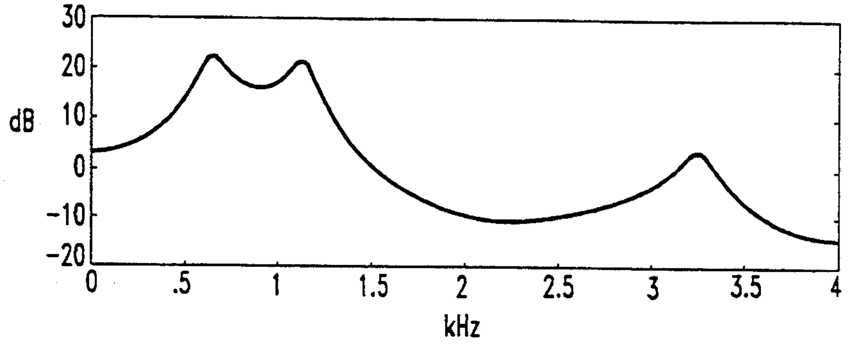

FIG. 10 presents an illustrative LPC filter frequency response based on LPC coefficients determined for a non-erased frame. As can be seen, the response contains certain "peaks." It is the proper location of these peaks during frame erasure which is a matter of some uncertainty. For example, correct frequency response for a consecutive frame might look like that response of FIG. 10 with the peaks shifted to the right or to the left. During frame erasure, since decoded speech is not available to determine LPC coefficients, these coefficients (and hence the filter frequency response) must be estimated. Such an estimation may be accomplished through bandwidth expansion. The result of an illustrative bandwidth expansion is shown in FIG. 11. As may be seen from FIG. 11, the peaks of the frequency response are attenuated resulting in an expanded 3 db bandwidth of the peaks. Such attenuation helps account for shifts in a "correct" frequency response which cannot be determined because of frame erasure.

According to the G.728 standard, LPC coefficients are updated at the third vector of each four-vector adaptation cycle. The presence of erased frames need not disturb this timing. As with conventional G.728, new LPC coefficients are computed at the third vector ET during a frame. In this case, however, the ET vectors are synthesized during an erased frame.

As shown in FIG. 1, the embodiment includes a switch 120, a buffer 110, and a bandwidth expander 115. During normal operation switch 120 is in the position indicated by the dashed line. This means that the LPC coefficients, $a_i$, are provided to the LPC synthesis filter by the synthesis filter adapter 33. Each set of newly adapted coefficients, $a_i$, is stored in buffer 110 (each new set overwriting the previously saved set of coefficients). Advantageously, bandwidth expander 115 need not operate in normal mode (if it does, its output goes unused since switch 120 is in the dashed position).

Upon the occurrence of a frame erasure, switch 120 changes state (as shown in the solid line position). Buffer 110 contains the last set of LPC coefficients as computed with speech signal samples from the last good frame. At the third vector of the erased frame, the bandwidth expander 115 computes new coefficients, $a_i'$.

Figure 5:
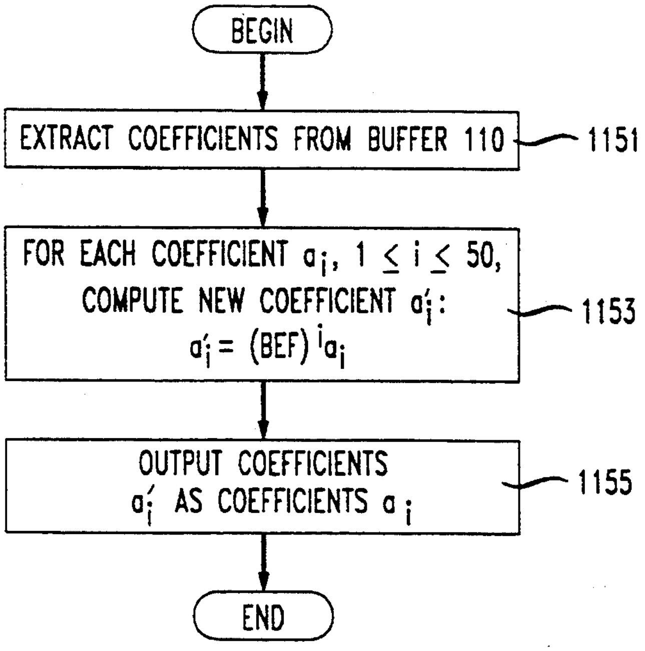
FIG. 5 presents a block-flow diagram of the LPC parameter bandwidth expansion performed by the bandwidth expander of FIG. 1.

FIG. 5 is a block-flow diagram of the processing performed by the bandwidth expander 115 to generate new LPC coefficients. As shown in the Figure, expander 115 extracts the previously saved LPC coefficients from buffer 110 (see step 1151). New coefficients $a_i'$ are generated in accordance with expression (1):

$$a_i' = (BEF)^i a_i,\ 1 < i < 50, \tag{1}$$

where BEF is a bandwidth expansion factor illustratively takes on a value in the range 0.95–0.99 and is advantageously set to 0.97 or 0.98 (see step 1153). These newly computed coefficients are then output (see step 1155). Note that coefficients $a_i'$ are computed only once for each erased frame.

The newly computed coefficients are used by the LPC synthesis filter 32 for the entire erased frame. The LPC synthesis filter uses the new coefficients as though they were computed under normal circumstances by adapter 33. The newly computed LPC coefficients are also stored in buffer 110, as shown in FIG. 1. Should there be consecutive frame erasures, the newly computed LPC coefficients stored in the buffer 110 would be used as the basis for another iteration of bandwidth expansion according to the process presented in FIG. 5. Thus, the greater the number of consecutive erased frames, the greater the applied bandwidth expansion (i.e., for the kth erased frame of a sequence of erased frames, the effective bandwidth expansion factor is $BEF^k$).

Other techniques for generating LPC coefficients during erased frames could be employed instead of the bandwidth expansion technique described above. These include (i) the repeated use of the last set of LPC coefficients from the last good frame and (ii) use of the synthesized excitation signal in the conventional G.728 LPC adapter 33.

C. Operation of Backward Adapters During Frame Erased Frames

Figure 6:
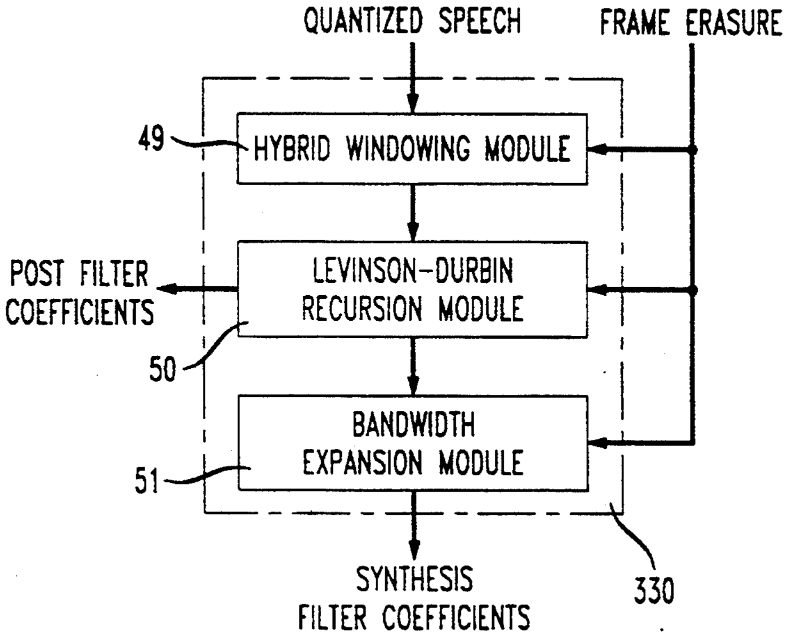
FIG. 6 presents a block diagram of the signal processing performed by the synthesis filter adapter of FIG. 1.

The decoder of the G.728 standard includes a synthesis filter adapter and a vector gain adapter (blocks 33 and 30, respectively, of FIG. 3, as well as FIGS. 5 and 6, respectively, of the G.728 standard draft). Under normal operation (i.e., operation in the absence of frame erasure), these adapters dynamically vary certain parameter values based on signals present in the decoder. The decoder of the illustrative embodiment also includes a synthesis filter adapter 330 and a vector gain adapter 300. When no frame erasure occurs, the synthesis filter adapter 330 and the vector gain adapter 300 operate in accordance with the G.728 standard. The operation of adapters 330, 300 differ from the corresponding adapters 33, 30 of G.728 only during erased frames.

As discussed above, neither the update to LPC coefficients by adapter 330 nor the update to gain predictor parameters by adapter 300 is needed during the occurrence of erased frames. In the case of the LPC coefficients, this is because such coefficients are generated through a bandwidth expansion procedure. In the case of the gain predictor parameters, this is because excitation synthesis is performed in the gain-scaled domain. Because the outputs of blocks 330 and 300 are not needed during erased frames, signal processing operations performed by these blocks 330, 300 may be modified to reduce computational complexity.

Figure 7:
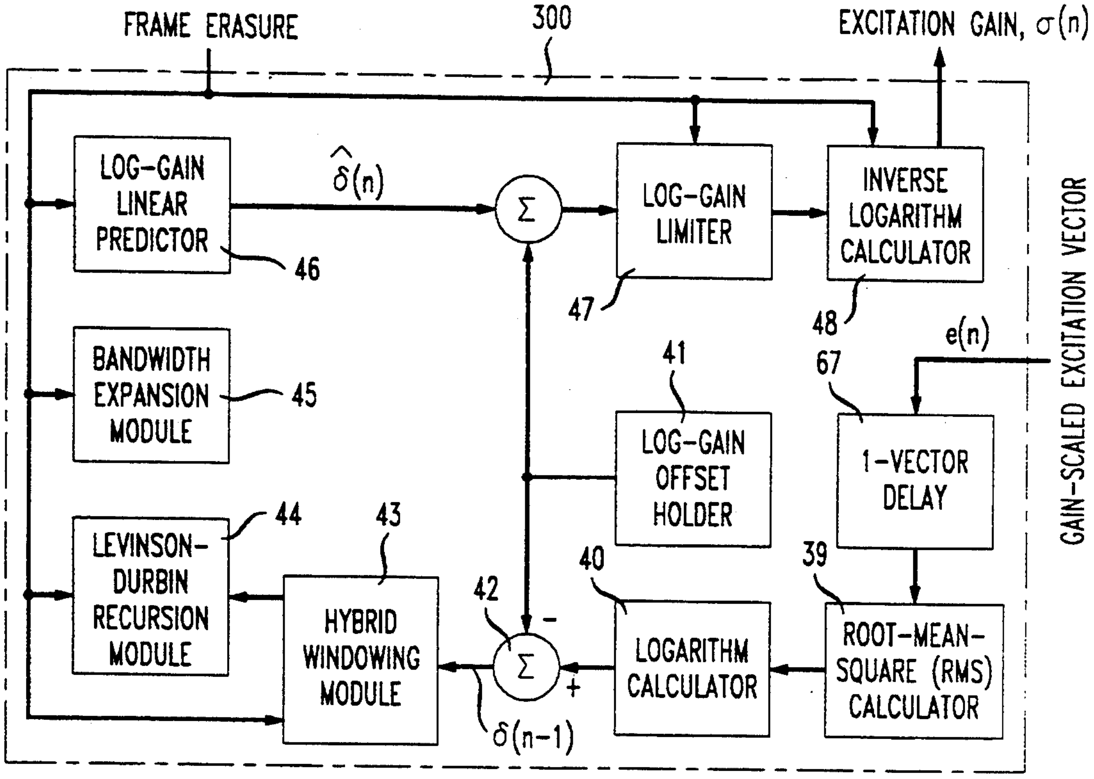
FIG. 7 presents a block diagram of the signal processing performed by the vector gain adapter of FIG. 1.

As may be seen in FIGS. 6 and 7, respectively, the adapters 330 and 300 each include several signal processing steps indicated by blocks (blocks 49–51 in FIG. 6; blocks 39–48 and 67 in FIG. 7). These blocks are generally the same as those defined by the G.728 standard draft. In the first good frame following one or more erased frames, both blocks 330 and 300 form output signals based on signals they stored in memory during an erased frame. Prior to storage, these signals were generated by the adapters based on an excitation signal synthesized during an erased frame. In the case of the synthesis filter adapter 330, the excitation signal is first synthesized into quantized speech prior to use by the adapter. In the case of vector gain adapter 300, the excitation signal is used directly. In either case, both adapters need to generate signals during an erased frame so that when the next good frame occurs, adapter output may be determined.

Advantageously, a reduced number of signal processing operations normally performed by the adapters of FIGS. 6 and 7 may be performed during erased frames. The operations which are performed are those which are either (i) needed for the formation and storage of signals used in forming adapter output in a subsequent good (i.e., non-erased) frame or (ii) needed for the formation of signals used by other signal processing blocks of the decoder during erased frames. No additional signal processing operations are necessary. Blocks 330 and 300 perform a reduced number of signal processing operations responsive to the receipt of the frame erasure signal, as shown in FIG. 1, 6, and 7. The frame erasure signal either prompts modified processing or causes the module not to operate.

Note that a reduction in the number of signal processing operations in response to a frame erasure is not required for proper operation; blocks 330 and 300 could operate normally, as though no frame erasure has occurred, with their output signals being ignored, as discussed above. Under normal conditions, operations (i) and (ii) are performed. Reduced signal processing operations, however, allow the overall complexity of the decoder to remain within the level of complexity established for a G.728 decoder under normal operation. Without reducing operations, the additional operations required to synthesize an excitation signal and bandwidth-expand LPC coefficients would raise the overall complexity of the decoder.

In the case of the synthesis filter adapter 330 presented in FIG. 6, and with reference to the pseudo-code presented in the discussion of the "HYBRID WINDOWING MODULE" at pages 28–29 of the G.728 standard draft, an illustrative reduced set of operations comprises (i) updating buffer memory SB using the synthesized speech (which is obtained by passing extrapolated ET vectors through a bandwidth expanded version of the last good LPC filter) and (ii) computing REXP in the specified manner using the updated SB buffer.

In addition, because the G.728 embodiment use a postfilter which employs 10th-order LPC coefficients and the first reflection coefficient during erased frames, the illustrative set of reduced operations further comprises (iii) the generation of signal values RTMP(1) through RTMP(11) (RTMP(12) through RTMP(51) not needed) and, (iv) with reference to the pseudo-code presented in the discussion of the "LEVINSON-DURBIN RECURSION MODULE" at pages 29–30 of the G.728 standard draft, Levinson-Durbin recursion is performed from order 1 to order 10 (with the recursion from order 11 through order 50 not needed). Note that bandwidth expansion is not performed.

In the case of vector gain adapter 300 presented in FIG. 7, an illustrative reduced set of operations comprises (i) the operations of blocks 67, 39, 40, 41, and 42, which together compute the offset-removed logarithmic gain (based on synthesized ET vectors) and GTMP, the input to block 43; (ii) with reference to the pseudo-code presented in the discussion of the "HYBRID WINDOWING MODULE" at pages 32–33, the operations of updating buffer memory SBLG with GTMP and updating REXPLG, the recursive component of the autocorrelation function; and (iii) with reference to the pseudo-code presented in the discussion of the "LOG-GAIN LINEAR PREDICTOR" at page 34, the operation of updating filter memory GSTATE with GTMP. Note that the functions of modules 44, 45, 47 and 48 are not performed.

As a result of performing the reduced set of operations during erased frames (rather than all operations), the decoder can properly prepare for the next good frame and provide any needed signals during erased frames while reducing the computational complexity of the decoder.

D. Encoder Modification

As stated above, the present invention does not require any modification to the encoder of the G.728 standard. However, such modifications may be advantageous under certain circumstances. For example, if a frame erasure occurs at the beginning of a talk spun (e.g., at the onset of voiced speech from silence), then a synthesized speech signal obtained from an extrapolated excitation signal is generally not a good approximation of the original speech. Moreover, upon the occurrence of the next good frame there is likely to be a significant mismatch between the internal states of the decoder and those of the encoder. This mismatch of encoder and decoder states may take some time to converge.

One way to address this circumstance is to modify the adapters of the encoder (in addition to the above-described modifications to those of the G.728 decoder) so as to improve convergence speed. Both the LPC filter coefficient adapter and the gain adapter (predictor) of the encoder may be modified by introducing a spectral smoothing technique (SST) and increasing the amount of bandwidth expansion.

Figure 8:
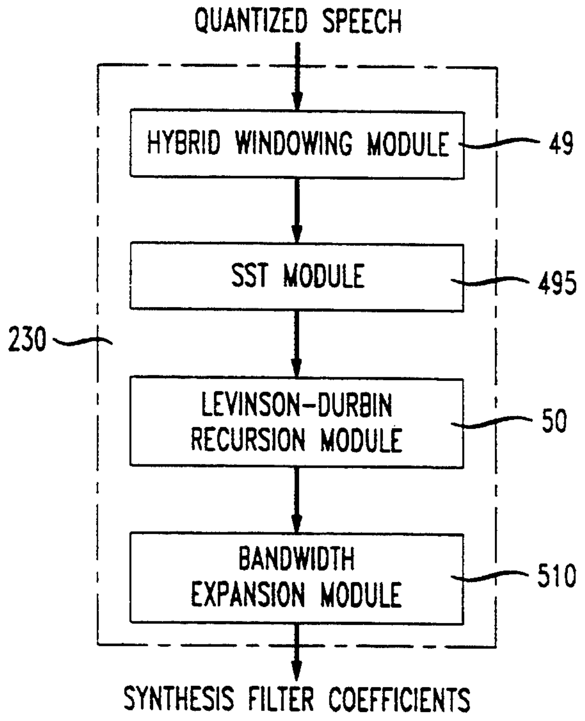
FIGS. 8 and 9 present a modified version of an LPC synthesis filter adapter and vector gain adapter, respectively, for G.728.

FIG. 8 presents a modified version of the LPC synthesis filter adapter of FIG. 5 of the G.728 standard draft for use in the encoder. The modified synthesis filter adapter 230 includes hybrid windowing module 49, which generates autocorrelation coefficients; SST module 495, which performs a spectral smoothing of autocorrelation coefficients from windowing module 49; Levinson-Durbin recursion module 50, for generating synthesis filter coefficients; and bandwidth expansion module 510, for expanding the bandwidth of the spectral peaks of the LPC spectrum. The SST module 495 performs spectral smoothing of autocorrelation coefficients by multiplying the buffer of autocorrelation coefficients, RTMP(1)–RTMP (51), with the fight half of a Gaussian window having a standard deviation of 60Hz. This windowed set of autocorrelation coefficients is then applied to the Levinson-Durbin recursion module 50 in the normal fashion. Bandwidth expansion module 510 operates on the synthesis filter coefficients like module 51 of the G.728 of the standard draft, but uses a bandwidth expansion factor of 0.96, rather than 0.988.

Figure 9:
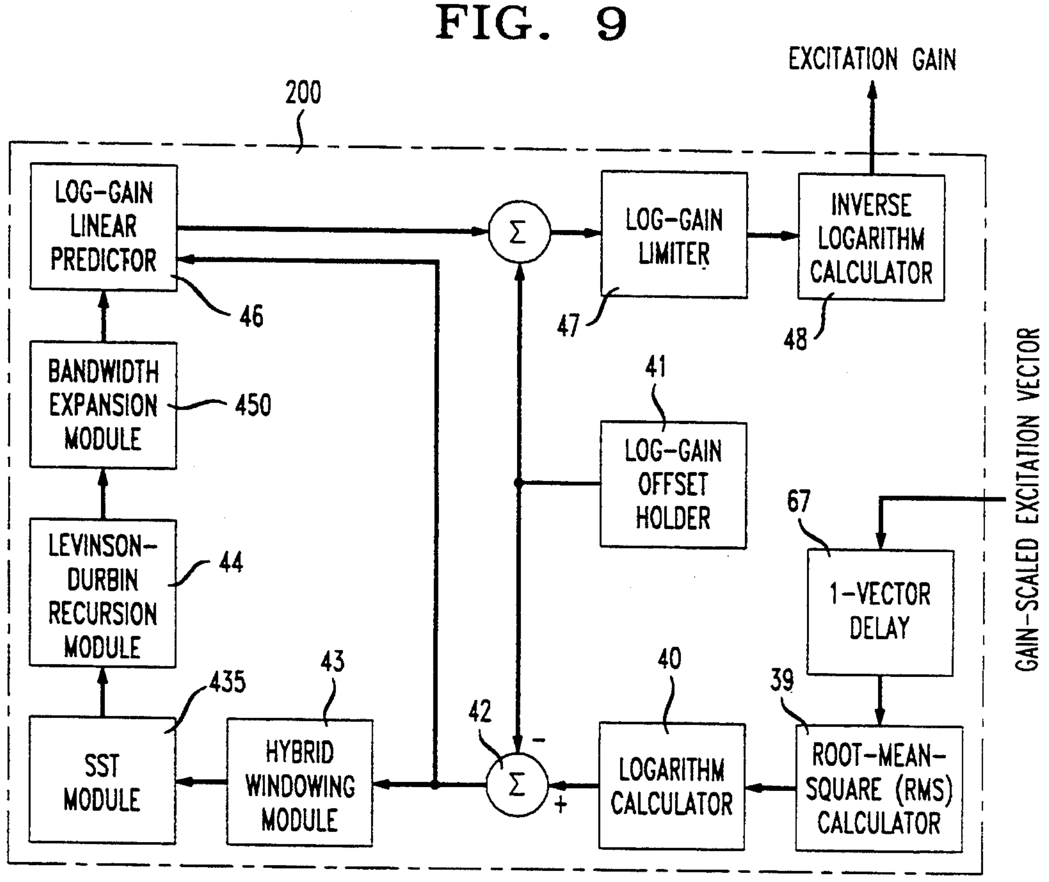

FIG. 9 presents a modified version of the vector gain adapter of FIG. 6 of the G.728 standard draft for use in the encoder. The adapter 200 includes a hybrid windowing module 43, an SST module 435, a Levinson-Durbin recursion module 44, and a bandwidth expansion module 450. All blocks in FIG. 9 are identical to those of FIG. 6 of the G.728 standard except for new blocks 435 and 450. Overall, modules 43, 435, 44, and 450 are arranged like the modules of FIG. 8 referenced above. Like SST module 495 of FIG. 8, SST module 435 of FIG. 9 performs a spectral smoothing of autocorrelation coefficients by multiplying the buffer of autocorrelation coefficients, R(1)–R(11), with the right half of a Gaussian window. This time, however, the Gaussian window has a standard deviation of 45Hz. Bandwidth expansion module 450 of FIG. 9 operates on the synthesis filter coefficients like the bandwidth expansion module 51 of FIG. 6 of the G.728 standard draft, but uses a bandwidth expansion factor of 0.87, rather than 0.906.

E. An Illustrative Wireless System

Figure 12:
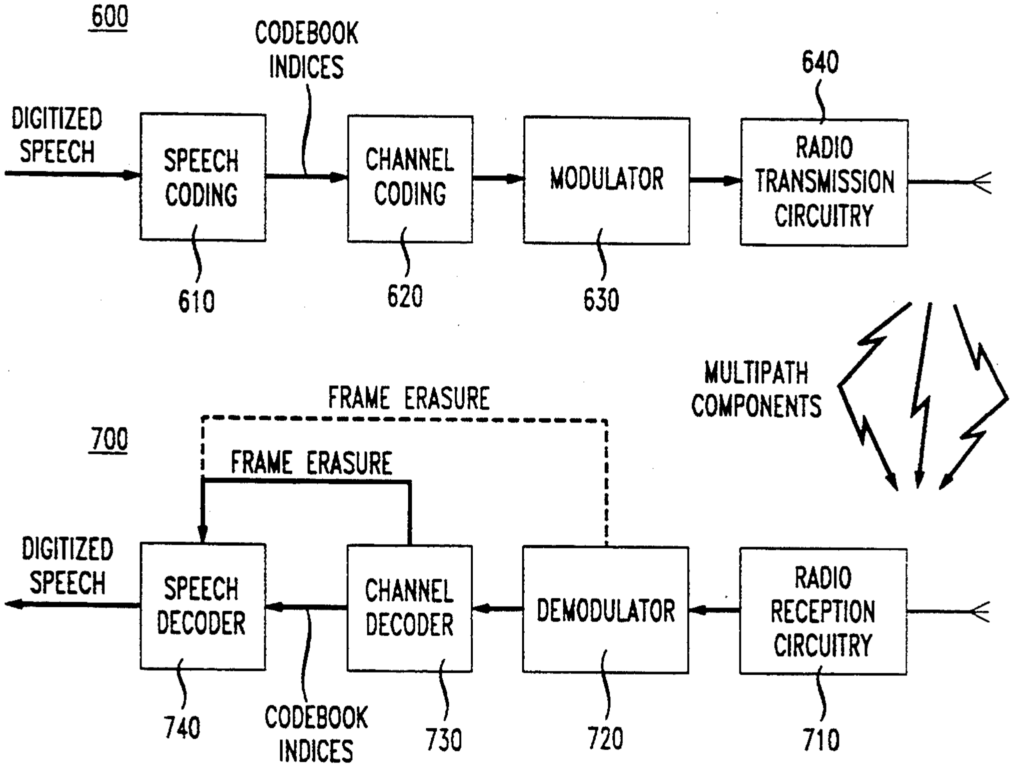
FIG. 12 presents an illustrative wireless communication system in accordance with the present invention.

As stated above, the present invention has application to wireless speech communication systems. FIG. 12 presents an illustrative wireless communication system employing an embodiment of the present invention. FIG. 12 includes a transmitter 600 and a receiver 700. An illustrative embodiment of the transmitter 600 is a wireless base station. An illustrative embodiment of the receiver 700 is a mobile user terminal, such as a cellular or wireless telephone, or other personal communications system device. (Naturally, a wireless base station and user terminal may also include receiver and transmitter circuitry, respectively.) The transmitter 600 includes a speech coder 610, which may be, for example, a coder according to CCITT standard G.728. The transmitter further includes a conventional channel coder 620 to provide error detection (or detection and correction) capability; a conventional modulator 630; and conventional radio transmission circuitry; all well known in the art. Radio signals transmitted by transmitter 600 are received by receiver 700 through a transmission channel. Due to, for example, possible destructive interference of various multipath components of the transmitted signal, receiver 700 may be in a deep fade preventing the clear reception of transmitted bits. Under such circumstances, frame erasure may occur.

Receiver 700 includes conventional radio receiver circuitry 710, conventional demodulator 720, channel decoder 730, and a speech decoder 740 in accordance with the present invention. Note that the channel decoder generates a frame erasure signal whenever the channel decoder determines the presence of a substantial number of bit errors (or unreceived bits). Alternatively (or in addition to a frame erasure signal from the channel decoder), demodulator 720 may provide a frame erasure signal to the decoder 740.

F. Discussion

Although specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the an without departing from the spirit and scope of the invention.

For example, while the present invention has been described in the context of the G.728 LD-CELP speech coding system, features of the invention may be applied to other speech coding systems as well. For example, such coding systems may include a long-term predictor ( or long-term synthesis filter) for converting a gain-scaled excitation signal to a signal having pitch periodicity. Or, such a coding system may not include a postfilter.

In addition, the illustrative embodiment of the present invention is presented as synthesizing excitation signal samples based on a previously stored gain-scaled excitation signal samples. However, the present invention may be implemented to synthesize excitation signal samples prior to gain-scaling (i.e., prior to operation of gain amplifier 31). Under such circumstances, gain values must also be synthesized (e.g., extrapolated).

In the discussion above concerning the synthesis of an excitation signal during erased frames, synthesis was accomplished illustratively through an extrapolation procedure. It will be apparent to those of skill in the art that other synthesis techniques, such as interpolation, could be employed.

As used herein, the term "filter refers to conventional structures for signal synthesis, as well as other processes accomplishing a filter-like synthesis function such other processes include the manipulation of Fourier transform coefficients a filter-like result (with or without the removal of perceptually irrelevant information).

I claim:

1. A method of generating linear prediction filter coefficient signals during frame erasure, the generated linear prediction coefficient signals for use by a linear prediction filter in synthesizing a speech signal, the method comprising the steps of:

storing linear prediction coefficient signals in a memory, said linear prediction coefficient signals generated responsive to a speech signal corresponding to a non-erased frame; and responsive to a frame erasure, modifying the stored linear prediction coefficient signals to expand the bandwidth of one or more peaks in a frequency response of the linear prediction filter, the modified linear prediction coefficient signals applied to the linear prediction filter for use in synthesizing the speech signal.

2. The method of claim 1 wherein the step of modifying the stored linear prediction coefficient signals comprises the step of scaling one or more of said stored linear prediction coefficient signals by a scale factor raised to an exponent, said scale factor being less than 1 and said exponent indexing the stored linear prediction coefficients.

* * * * *